Figure 1:
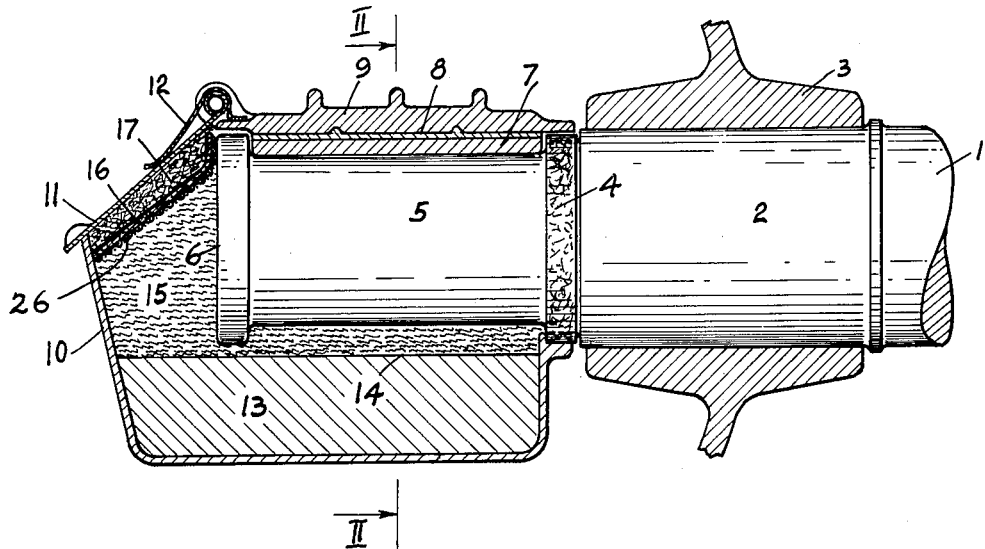

Feb. 28, 1956      C. B. FRANCIS      2,736,619

JOURNAL BOXES AND LUBRICANTS THEREFOR

Filed Feb. 13, 1952

INVENTOR.
CHARLES B. FRANCIS.
BY
Christy, Parmelee and Strickland
his attorneys

United States Patent Office 2,736,619
Patented Feb. 28, 1956

2,736,619

JOURNAL BOXES AND LUBRICANTS THEREFOR

Charles B. Francis, Pittsburgh, Pa., asisgnor to Loftus Engineering Corporation, a corporation of Maryland Application February 13, 1952, Serial No. 271,318

6 Claims. (Cl. 308—79)

This invention relates to the lubrication of heavy-duty journals and bearings, and is particularly directed to certain new and useful improvements in the lubrication of journals of the type that have solid bearings, as distinguished from roller or ball bearings. The invention is primarily, although not exclusively, intended for journals and bearings of railroad freight cars, and in such particular field of service the invention will be described.

The journals and bearings of railroad freight cars are enclosed within containers known as journal boxes that are carried by the chassis of the cars, and hithero the lubrication of the bearings has been accomplished by stuffing each journal box with a packing of cotton fiber known as "waste," and then flooding the waste with a medium to heavy lubricating oil. The saturated body of waste bears upon an exposed area of the journal beneath the bearing and wipes a film of the oil upon the journal when the car travels and the journal is in rotation. Another known method of lubricating such bearings consists in supporting a wick in contact with the exposed area of the journal, while the lower end of the wick is immersed in a pool of oil contained in the journal box.

The flow of lubricant from the packing or wick to the surface of the journal is effected by capillarity, the flow depending on the viscosity of oil and the rate to which the oil is removed from the fiber terminals in the waste or wick. As a journal can carry only a film of oil under most favorable conditions, the flow of lubricant is slow. In general the viscosity of lubricating oils increases as their temperatures decrease. Railroad cars are exposed to varying temperatures, ranging from about 40 deg. F. below zero to 120 deg. F. above, wherefore the foregoing methods of lubrication have not been ideal. In fact, it is only the lightest paraffinic lubricating oils which have pour points as low as 20 deg. F. below zero, with the result that adequate lubrication of railroad car journals is not obtained in cold weather. Faulty lubrication results in dry bearings and "hot boxes."

In the use of waste packing or wicks there is a tendency for some of the fibers to be carried between the surfaces where the bearing engages the journal, and such fibers increase the friction and tend to injure the bearing, as well as to increase the hazard of hot boxes. Frequent inspections by railroad mechanics are required to make certain that adequate quantities of waste and lubricating oil are in the journal boxes of cars in service, otherwise hot boxes will surely develop, with the consequent loss of time, and delays in transportation schedules. The economic loss (due to hot boxes) to the railroads of the United States amounts to several million dollars per year, and the cost of servicing journal boxes is very great.

Open-topped freight cars used in the transportation of coal, ore, and other bulk materials are frequently unloaded by means of car dumpers, which invert the cars in the dumping operation. Any oil in the journal boxes of a car not absorbed by the waste packings or wicks is, in the car-dumping operation, spilled from the boxes and lost. The oil retained by the packings or wicks is capable of lubricating the bearings for only a short period of time, whereby the development of hot boxes is promoted.

Dust is also a factor that determines the life of the bearings of a railroad car. As is generally known, the journals of a railroad car not only rotate but move laterally when the car is in motion. This lateral movement of the journals in their journal boxes effects an inhalation and expulsion of air, causing the boxes to "breathe," with the consequence and effect that dust-laden air is continually being drawn into and forced out of the box. Although dust guards are provided on the axles of the car, and although the lids of the boxes are made to seat tightly upon the mouths of the boxes, it has been found that over a period of time substantial quantities of dust are collected and retained by the waste or wicks. Practically all of such dust is of a gritty nature which, becoming entrained with the lubricating oil, reacts with an abrasive effect upon the bearing surfaces. Furthermore, moisture drawn in similar manner from the outer atmosphere collects in the journal boxes and impedes the efficiency of bearing lubrication.

The object of my invention is to overcome the difficulties and eliminate the objections outlined in the foregoing context. It is particularly my object to eliminate the economic loss and the transportation delays encountered by the development of hot boxes on railroad cars.

It is further an object of the invention to dispense with the necessity of frequent manual inspection of the journals and bearings of railroad cars, whereby the "human element" may be minimized in the car maintenance departments of railroads. In accordance with my aims the journal boxes of railroad cars, once charged with lubricant and inspected, may serve effectively for two years or more without the development of hot boxes, and without the need for repeated manual inspections.

In the realization of such objects my invention is found in certain new and useful improvements in the lubrication of journal boxes, and in an improved lubricant therefor. The invention consists both in apparatus and in method.

Figure 2:
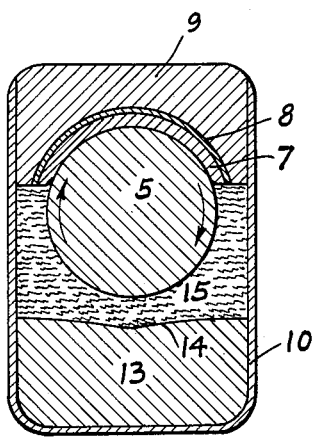

Referring to the accompanying drawings:

Fig. 1 is a fragmentary view in vertical, longitudinal section of a typical journal box of a railroad freight car, illustrating the associated bearing, journal, car axle and wheel; and Fig. 2 is a view in vertical cross-section of the structure, as seen on the plane I—I of Fig. 2.

Referring to the drawings an axle of a railroad car is fragmentarily indicated at 1. On a seat 2 formed integrally with the axle, a wheel 3 (the hub of the wheel only is shown) is rigidly secured, and from the seat 2 an integral journal 5 extends into a journal box 10. Within the journal box a bearing 7 engages the journal from above. The top 9 of the journal box provides one of the truck rests of the chassis of the railroad car, and the top 9 of the journal box, the bearing 7 and journal 5 transmit the proportional load from the car chassis to the wheel 3. Between the wheel seat 2 and the journal 5 the axle includes an annular portion which is positioned in an opening in the inner end wall of the journal box, and such annular portion is equipped with a sealing ring 4 of felt or other suitable material. The ring 4 snugly engages a seat formed in the rim of the opening in the inner end wall of the journal box and serves to exclude dust and dirt, and to prevent the escape of lubricant from within the box. At the outer end of the journal 5 a collar 6 is integrally formed, and the bearing 7 is laterally confined between such collar and the annular portion of the axle that carries the seal 4.

The bearing 7 is a block or so-called solid bearing, molded of babbitt or other suitable bearing composition. The bearing 7 is backed by a bearing support 8 formed of brass which seats against the load-transmitting wall 9 of the journal box.

A doorway is formed in the outer end wall of the journal box, and this doorway is normally closed by a lid 11 under the stress of a spring 12 mounted on common axis with the lid hinge at the top of the box.

This journal and bearing assembly, together with the journal box structure illustrated, is typical of the many types of journal and bearing assemblies to be found in present-day railroad cars.

It should be noted that the journal box is so fashioned as to provide below and around the journal a reservoir. Heretofore, such reservoir of the journal box was packed with cotton-fibre waste, flooded with a medium to heavy lubricating oil. The oil-soaked waste makes contact with the bottom and side surface areas of the journal exposed beneath the bearing 7, and when the journal rotates, as it does when the car travels, oil is transferred from the waste to the surface of the journal and the bearing is thus lubricated.

In the use of lubricating wicks, a wick is supported with its upper end in contact with the journal surface exposed below the bearing, and the lower end of the wick is immersed in a pool of lubricating oil contained in the reservoir of the journal box. The wick serves to conduct oil by capillarity from the pool to the surface of the journal.

As distinguished from such prior practice, I dispense with the use of packings of waste and wicks. More particularly, I introduce a filler 13 to the bottom of the reservoir in the journal box. Such filler may consist of a low-melting-point metal, or it may consist of a paraffinic wax having a melting point between 150 deg. F. and 160 deg. F. In either case the material is melted and poured into the box to a level of about ½" below the collar 6 on the journal. The molten material is allowed to cool, and as it cools it contracts and solidifies to form beneath the journal a solid floor having a surface 14 that slopes downwardly from opposite sides of the journal box, forming a valley beneath the center of the journal.

It presently appears that wax of the characteristics specified is preferred as the material to use for the purpose, since the wax itself is capable of serving as a lubricant under certain conditions. Furthermore, if in service some of the wax should become mixed with the lubricant used the latter is not adversely affected thereby.

Another advantage of this wax is its low cost. In large quantities a suitable grade of wax may be purchased for 6¢ to 7¢ a pound, and the cost of melting and adding it to the box should not exceed 2¢ per pound. An average of a little less than 2 lbs. is required per box, and one filling will last as long as the box is in service.

While paraffin wax is cheap and probably the wax best suited for the purpose, other waxes, having melting points above 150 deg. F., such as beeswax, may be used. Also, other materials, such as coarse sand or fine gravel may first be added to occupy about half of the space 13, and the molten wax then poured in to fill the box to the proper level. The effect of using such additional materials is to change the contour of the floor where it may be desired to make the floor surface almost level.

Next, using a grease gun, I fill the space 15 above the floor to within 1 to 1½ inches of the lid 11 with an improved, specially compounded lubricant of paste-like or semi-solid consistency at room temperature. Such lubricant forms an essential part of this invention.

After the box has been filled with the grease, I cover the surface completely with a piece of felt 16, about ¼ inch thick, first dipping the piece of felt in molten paraffin wax of the same grade as that used in forming the floor of the box and making sure that the edge of the felt in contact with the collar of the journal is heavily coated with the wax to prevent the rotating collar from detaching fibers from the felt. In refinement the felt may be backed with a web of wire screen 26. Finally, I pack the space 17 between the waxed felt and the lid of the box with either cotton or waste such as that heretofore used to pack the box. These fibers act both as a filter and an absorbent to separate any dust or entrained moisture drawn under the lid into the box by the breathing action previously described. In time, the water evaporates, but the dust is retained permanently by the filter.

Regarding the specially compounded lubricant used, a general requirement is that each component of the mixture shall be a lubricant. It is noteworthy that the compounds or mixtures of the components of this invention are non-oxidizing and have no corrosive effect upon carbon steel. Experiments indicate that any one of the following mixtures may be used. These mixtures and the methods of preparing them are described in the order of their superiority as follows:

Lubricant A

*Vegetable oil mixture.*—This mixture consists of 80% by weight of a non-oxidizable vegetable oil mixture made up largely of hydrogenated castor oil and sold under the trade name of "Celvacene, medium," a semi-solid that melts between 145 deg. and 150 deg. F.; 15% of molybdenum disulfide, which is a dry powder and the best of the mineral lubricants; about 2% of No. 10 or lighter automobile oil, having a pour-point below 0 deg. F.; and 3% of polyethylene glycol, which is a clear colorless liquid changing to a solid at 24 deg. F. below zero and boiling at about 370° F. above.

The consistency of the Celvacene is first adjusted to that desired by adding the automobile oil gradually and mixing the two mechanically. Then the molybdenum sulfide and the ethylene glycol are added, and the mixing is continued till the mass appears to be uniformly mixed.

At ordinary temperatures, say from 20 deg. F. to 90 deg. F., the mass as a whole acts as a lubricant and is characterized by a stickiness that causes it to adhere to the journal, which carries it to and into the bearing as the former rotates in either direction. At temperatures above 90° F., and up to the melting point of the Celvacene the lubricating action is the same, only the consistency of the lubricant being changed to cause the lubricant to settle toward the bottom of the box and against the journal.

At extremely low temperatures, from 20 deg. F. to −25 deg. F., the polyethylene, which forms only a mechanical mixture with the oil and greases and separates as the mass is cooled, acts as the liquid lubricant while the molybdenum sulfide acts as a solid lubricant. At temperatures from −25 deg. F. to −40 deg. F., only the molybdenum sulfide may act as a lubricant, but the little carried into the bearing at higher temperatures is sufficient to protect the bearing for several hundred miles, and long before a hot box can develop the polyethylene and the Celvacene mixture begin to function again as lubricants. With the box packed full, even the lateral movements of the journal within the box aid in forcing the grease into contact with the journal.

The relatively high cost of this lubricating compound is offset by many advantages:

1. The car may be upset without spilling the contents of the box.
2. One packing of the box, if properly done, will last indefinitely.
3. The properties of the lubricant do not change on long exposure to the air, and the lubricant resists, or is immune to, contamination by water and dust.

4. Once properly packed, the box requires no further attention, and the causes of hot boxes are eliminated, including the extent to which the human element is responsible for them.

Lubricant B

*Animal oil mixtures.*—Of the animal oils and fats, only lanolin and the tallows (beef or mutton melting above 125 deg. F.) are suitable for the purpose in mind. These mixtures may be made up in the same manner and in the same proportions as in Lubricant A, the lanolin or tallow selected being substituted for the Celvacene. However, to increase the stickness and control the consistency of the compound I prefer to substitute polyglycol for the automobile oil. While the cost of this mixture is only slightly more than ⅓ that of Lubricant A, the melting points of lanolin and the tallows are too low for cars operating in districts with a hot climate and the mixture is slightly inferior to Lubricant A.

Lubricant C

*Mineral oil mixture.*—To provide a less expensive mixture having lubricating properties approaching those of the ideal mixture of Lubricant A, I first select a white paraffin wax having a melting point close to 150° F., or above. Next, I heat a weighed portion of this wax to a temperature about 5 deg. F. above its melting point and while stirring add constantly 1% by weight of polyglycol, 4% by weight of polyethylene glycol and sufficient No. 10 or lighter automobile oil, so that the mixture will be of an easily workable consistency when cooled to between 90 deg. and 100 deg. F. At this point and with constant stirring I add gradually molybdenum disulfide until the total added is equal to 15% by weight of the original weight of wax used. After adding the last of the sulfide, the stirring is continued to give a uniform mixture that can be readily ejected from a grease gun. If a small sample cooled to the outside working temperature appears too stiff for easy ejection, the compound is thinned to the desired consistency by adding 1% of polyethylene glycol, and more of the automobile oil, but care is taken to see that the compound is not thinned to the point where it will flow at 110 deg. F.

Like the mixture of Lubricant A, at outdoor air temperatures above freezing, the mixture adheres to the journal and all components serve as lubricants. At temperature below freezing the wax solidifies, forcing the polyglycol, automobile oil, and polyethylene glycol to separate as a viscous liquid. This liquid, with the little molybdenum disulfide it carries in suspension serves as an excellent lubricant down to the pour-point of the automobile oil, or about 0 deg. F., and from this point to about −25 deg. F., the polyethylene glycol and molybdenum disulfide act as the lubricant.

While this mixture may not be as superior as Lubricant A, the cost is much less, ranging between 35¢ and 40¢ per pound, according to location, labor costs and other variables. However, aside from railroad freight cars, other conditions, rather than costs, will determine whether Lubricant A or C should be used. For example, in the operation of certain costly machines, it is often advisable to use the best lubricant available irrespective of its cost.

Lubricant D

*Glycerol-starch mixture.*—The following formula provides an effective lubricant at a still lower cost. The lubricant of this compound consists of 10 parts by weight of glycerol (glycerine); 7 to 10 parts starch (depending upon the kind of starch, whether wheat, corn or potato); 10 parts of No. 10 or lighter automobile oil, thinned if desired with 1% to 2% of polyglycol; 3 parts of polyethylene glycol, having a molecular weight of approximately 200 for cold climates or 400 for warm climates; and 3 to 4 parts of molybdenum disulfide.

The mixture is prepared by first mixing the starch and glycerol to form a smooth paste; heating the paste, while constantly stirring it, to the boiling point of the glycerine (about 550 deg. F.); permitting the mixture to cool to a temperature near 300° F.; adding the oil, or oil and polyglycol; and continuing the stirring vigorously as the mixture cools to about 100 deg. F., at which point the molybdenum disulfide is added, followed by the polyethylene glycol, and the stirring is continued until the mixture is of a uniform color and smooth texture.

Like lubricants A to C, compound D has a consistency comparable to that of grease, and such consistency can be controlled by varying the proportion of starch. All components act as lubricants above 40 deg. F. At lower temperatures all the liquid components separate and act as a lubricant down to the freezing point of the glycerol, or about 32 deg. F. As the glycerol freezes the oil (also polyglycol, if added) and polyethylene glycol act as lubricants down to the pour-point temperature of the oil, which may be 20 to 30 deg. F. below zero. At still lower temperatures the polyethylene glycol and molybdenum disulfide act as lubricants to prevent overheating of the bearing. Under such conditions of extremely low temperature, any decrease in the quantity of liquid lubricant on the journal causes the bearing and journal to rise in temperature, and, with the journal box packed with lubricant mixture D, the lubricants freed as fluids increase as the temperature rises. Thus, the compound is fully and automatically effective over the range of temperatures encountered in service.

The four lubricant formulae given in the foregoing context as typical examples of the lubricant of my invention each include molybdenum disulfide and polyethylene glycol which are mechanically mixed with the other ingredients. In each formula the said other ingredients will be understood to comprise a lubricant base having a melting point above 125 deg. F. The molybdenum disulfide comprises a solid mineral lubricant in finely divided form which is mixed throughout the body of the lubricant base, while the polyethylene glycol comprises a liquid lubricant that is mixed throughout the body of the base and retained therein somewhat after the manner that a sponge retains water or a more viscous liquid. The several ingredients that are compounded to form the lubricant base in each formula themselves form severally lubricants which in service become effective sequentially, as described above, and thus provide a plurality of lubricating substances which are auxiliary to and cooperate with the molybdenum disulfide and polyethylene glycol.

It will be understood that a number of modifications may be made in the journal-box and lubricants described herein, without departing from the spirit of the invention defined in the appended claims.

I claim:

1. A railroad car axle having a journal, a journal box into which said journal extends, a bearing block in said box engaging said journal from above, a reservoir extending beneath and around the body portion of said journal exposed below said bearing block, a molten filler body poured into and solidified in said reservoir to form a floor beneath said journal, and a charge of lubricant, which is semi-solid at room temperature, supported on said floor in contact with said body portion of the journal below the bearing block.

2. A railroad car axle having a journal, a journal box having an inner end wall through which said journal extends, a bearing block in said box engaging said journal from above, said journal box having an outer end wall including a doorway, a lid closing said doorway, a reservoir extending beneath and around the body portion of said journal exposed below said bearing block, a molten filler body poured into and solidified in said reservoir to form a floor beneath said journal, a charge of lubricant which is semi-solid at room temperature supported on said floor and in contact with said body portion of the journal below the bearing block, and an air filtering device positioned within said doorway of the journal box.

3. The structure of claim 1, in which said charge of lubricant is formed of a lubricant base, having a melting point of substantially 125 deg. F. or more, carrying in mechanical mixture therewith molybdenum disulfide in finely divided form.

4. The structure of claim 1, in which said charge of lubricant is formed of a lubricant base, having a melting point of substantially 125 deg. F. or more, carrying in mechanical mixture therewith molybdenum disulfide in finely divided form and a substantial quantity of polyethylene glycol.

5. In the combination of a railroad car axle having a journal, a journal box into which said journal extends, a bearing block in said box engaging said journal from above, a reservoir extending beneath and around the body portion of said journal exposed below said bearing block, and means for lubricating said journal and bearing; the invention described comprising a lubricant-displacing solid filler body introduced to said reservoir and forming a floor beneath said journal, and a charge of semi-solid lubricant compound having a pour-point above 110 deg. F. supported on said floor and in contact with the body portion of said journal exposed below said bearing block.

6. In the combination of a railroad car axle having a journal, a journal box into which said journal extends, a bearing block in said box engaging said journal from above, a reservoir extending beneath and around the body portion of said journal exposed below said bearing block, and means for lubricating said journal and bearing; the invention herein described wherein said means comprise a charge formed of a semi-solid lubricant base carrying in mechanical mixture therewith molybdenum disulfide in finely divided form, and a solid filler block in said reservoir for displacing said semi-solid lubricant upwardly.

References Cited in the file of this patent

UNITED STATES PATENTS

| | | |
|---|---|---|
| 162,950 | Rhoads | May 4, 1875 |
| 761,903 | Poirrier | June 7, 1904 |
| 1,400,237 | Proudfoot | Dec. 13, 1921 |
| 1,510,377 | Blose | Sept. 30, 1924 |
| 1,678,294 | Macway | July 24, 1928 |
| 2,449,510 | Robertson | Sept. 14, 1948 |
| 2,599,683 | Stross | June 10, 1952 |